UNITED STATES PATENT OFFICE.

ROBERT BELL, OF LONDON, ENGLAND.

METHOD OF TREATING SURFACES TO BE PROTECTED FROM FOULING.

No. 817,743.   Specification of Letters Patent.   Patented April 17, 1906.

Application filed May 17, 1905. Serial No. 260,880.

*To all whom it may concern:*

Be it known that I, ROBERT BELL, a subject of the King of the United Kingdom of Great Britain and Ireland, residing at London, W., England, have invented new and useful Improvements in Methods of Treating Surfaces to be Protected from Fouling, of which the following is a specification.

This invention relates to a method of treating surfaces to be protected from fouling or to be rendered antiseptic.

In the invention the surface to be treated is first coated with a layer of paint, varnish, or the like, and before said layer is dry flowers of sulfur, ground sulfur, or equivalent pulverulent insoluble impalpable sterilizing agent is forced or blown into the same by the action of a current of compressed air at a pressure of about forty pounds. If desired, the surface may be smoothed by rolling. The effect of this treatment is absolutely to prevent existence of organic life on the protected surface. The invention may therefore be applied to provide a cheap and most effective antifouling covering for the sides and bottoms of ships' hulls, piles, piers, and submerged structures generally or to provide an antiseptic coating for walls of buildings, such as hospitals, urinals, water-closets, and the like.

Sulfur has already been proposed as an ingredient of antifouling compositions for ships; but the practice heretofore has been to encapsule the sulfur in oil or analogous material, whereby the said sulfur was prevented from exercising any effective sterilizing action. According to the herein-described process the fine powdered sulfur forms a film or crust on the surface of the paint and constitutes an absolutely protective sheath through which the growths cannot penetrate and upon which they cannot settle. Owing to the impalpable nature of the serilizing agent pulverulent sulfur or the like is merely caught by the paint to form a superposed layer or crust, as hereinbefore described.

My process can be employed for coating a ship at only a minute fraction of the cost of previously-used sheathings, sulfur and suitable adhesive liquids being common commercial commodities of cheap price. Sulfur being insoluble in water, no electrolytic action detrimental to either the paint or structure below is set up, and a coating applied by my process is therefore practically permanent.

Having now described my invention, what I claim, and desire to secure by Letters Patent of the United States, is—

1. A method of treating surfaces to be protected from fouling or to be rendered antiseptic consisting in coating the said surfaces with a layer of paint, varnish or the like and forcing sulfur into said layer, by the action of compressed air, before drying.

2. A method of treating surfaces to be protected from fouling or to be rendered antiseptic consisting in coating the said surfaces with a layer of paint, varnish or the like and blowing powdered sulfur on said layer so as to superpose a protecting crust on said layer, as described.

3. A method of treating surfaces to be protected from fouling or to be rendered antiseptic consisting in coating the said surfaces with an adhesive layer and superposing a layer of powdered sulfur on said adhesive layer.

4. An antifouling covering consisting of a layer of paint, varnish or the like and a superposed layer of powdered sulfur.

In testimony whereof I have signed my name to this specification in the presence of two subscribing witnesses.

ROBERT BELL.

Witnesses:
 JNO. ARMSTRONG, Junr.,
 W. HOWIESON.